United States Patent Office 3,487,726
Patented Jan. 6, 1970

3,487,726
AUXILIARY OVERDRIVE GEAR
Stanley Frederick Burnett, Hawkesbury, near Coventry, England, assignor to Self-Changing Gears Limited, Coventry, England, a British company
Filed June 28, 1967, Ser. No. 649,677
Claims priority, application Great Britain, July 4, 1966, 29,886/66
Int. Cl. F16h 57/10, 3/44
U.S. Cl. 74—781                           7 Claims

ABSTRACT OF THE DISCLOSURE

A two-speed auxiliary over-drive gear having a planetary gear arrangement. The ring gear is connected to the output and the planet carrier is connected to the input. A clutch between the sunwheel and the planet carrier maintains normal direct drive under the action of springs, and a pneumatically-operated brake between the sunwheel and the housing produces overdrive.

---

The invention relates to an improved auxiliary gear of the type in which a two speed epicyclic or planetary gear is arranged for connection in series with a main change speed gearbox and is provided with means for engaging either condition of the gearing as required by the driver of the vehicle.

Auxiliary gears of this type of known design having planetary and epicyclic gear mechanisms are known in which uni-directional clutches are employed to connect a part of the mechanism to the driven shaft to obtain direct drive, and the alternative condition of the gear is obtained by applying a brake to prevent rotation of another part of the mechanism. A disadvantage of this arrangement is that in the direct drive condition the connection between shafts is broken when the driven shaft is rotating faster than the driving shaft, and therefore additional clutching means is required to enable the engine to be used for retarding the vehicle. Use of a uni-directional clutch also raises problems in obtaining a smooth transition from one condition of the gearing to the other.

Two-speed gears are also known in which dog tooth or spline clutches are used to effect the gear changes. Additional complicated synchronising mechanisms are required to ensure smooth gear changes. A neutral condition of the gearing is necessary between the defined ratios and this does not permit the gear-changes to be effected without loss of drive.

Other types of known two-speed gears employ cone or multi-plate friction clutches and are usually of complicated and cumbersome design incorporating reactor rings and pressure plates of large size and weight which must be accelerated or decelerated during gear changes and thus are detrimental to quick smooth gear changing. In some of these designs (see for example U.S. Patent No. 2,870,655) the axial thrust employed to engage the brake holding the reaction member in the indirect gear condition is resisted by anti-friction bearings which are thus loaded heavily in a static condition. As is well known, this can have a disastrous effect on the life of such bearings particularly in environments where shock or vibration are likely to be present. A further problem may arise with some of these designs intended to be driven from either shaft of the gearing, i.e. in which the output may be used as the input and vice versa. For a simple epicyclic gear employed primarily as a reduction (under drive or "crawler" gear) with sunwheel input and planet carrier output, such an action would in practice result in an overdrive gear having severely limited ratios available.

For example, a reduction gear of this type having a 3:1 reduction ratio, when reversed and employed as an overdrive gear, would have an overdrive ratio also of 3:1. The practical minimum limit for such a gear would appear to be about 2.5:1 overdrive which is of severely limited value when considered for application to motor vehicle transmissions of the type for which the present invention is intended.

Generally it is an object of the present invention to provide a simplified auxiliary two-speed gear of the aforementioned type, having a direct drive (unit speed ratio), an overdrive ratio, and no neutral condition of the gearing, to facilitate change of gear ratio without loss of drive.

A further object of the invention is to keep to a minimum the weight of those parts of the gearing which must be accelerated or decelerated during the change of ratios, so that the reduced inertia effect of these parts will permit the changes of gear to be completed more quickly and smoothly.

A more specific object of the invention is to provide a two-speed gear in which the direct drive is effected by spring-operated multi-plate friction clutch means independent of any external means, and in which the direct drive is the normal or static condition of the gearing, the axial thrust from spring means not imposing any load upon bearings mounting the rotating parts of the gearing, not requiring additional bearings for its transmission, and being contained within vertical thrust faces of rotating parts which are permanently attached together or to a common part and thus providing the action and reaction for the axial thrust.

A further specific object of the invention is to provide a two speed gear, in which the overdrive ratio is effected by pneumatically operated multi-plate friction brake means energised from an external source operating through the afore-mentioned spring means which effects the direct drive condition, and in which overdrive ratio the axial thrust from the pneumatic means does not impose any load upon the bearings provided for mounting the rotating parts of the gearing or require additional bearings for its transmission, but is contained within vertical thrust faces of a stationary gear casing, which thus provide the action and reaction for the axial thrust.

It is yet another object of the invention to provide a close ratio two speed auxiliary gear in which the overdrive ratio will be within the practical and desirable limits of 1.2:1 and 1.5:1 such that it would be used as a "range-splitter" in conjunction with a main change-speed gearbox having ratio steps of the order of 1.4 to 2.2.

The invention provides in a two-speed auxiliary gear comprising a housing; bearings in the housing; co-axial input and output shafts rotatably mounted in the said bearings; a planetary gear arrangement including a sunwheel, a ring gear rotatably mounted in the said housing and connected to one of the said shafts, and at least one planet wheel and carrier connected to the other of the said shafts; the improvement comprising a multi-plate clutch operatively interposed between the sunwheel and the planet carrier, the said multi-plate clutch comprising a driven member engaging the sunwheel, a reaction member engaging the sunwheel, a pressure plate engaging the sunwheel and being axially movable between the reaction member and the driven member, spring means between the driven member and the pressure plate biasing the pressure plate towards the reaction member for normally maintaining the said multi-plate clutch to effect direct drive; means on the sunwheel limiting axial movement of the driven member in a direction away from the reaction member and means limiting axial movement of the reaction member in a direction away from the driven member for absorbing the action and reaction of the spring means and thereby preventing transference of the said action or reaction, to the said bearings; a brake operatively interposed between the sunwheel and the housing; and pneumatically-actuated biasing means for compressing the said spring means to actuate the brake and progressively change the drive from direct to indirect drive.

Pneumatic pressure is supplied by means of a compressor which may be driven by the prime mover of the vehicle, or by a drive taken from the main change speed gearbox. The drivers control for the auxiliary gearbox would be of similar design to that required by the main change speed gearbox and would normally consist of a manually or automatically operated pneumatic or electro-pneumatic valve.

The invention will be further described with reference to two embodiments shown in the accompanying drawings, wherein.

Figure 1:
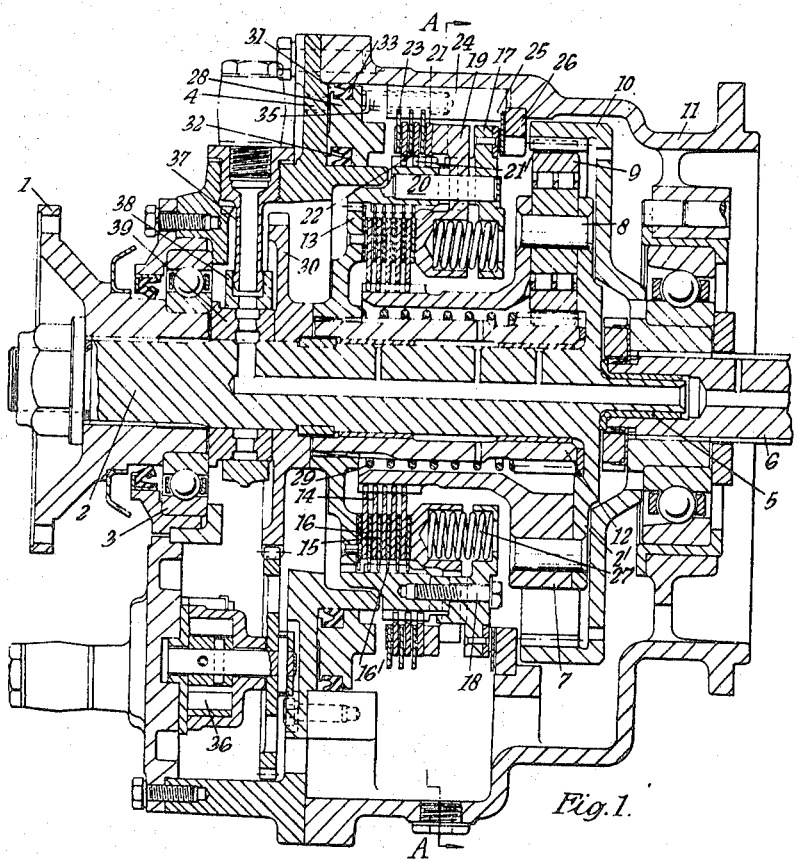
FIG. 1 shows a vertical section of the auxiliary overdrive gear.

In FIG. 1 an input coupling 1 drives an input shaft 2 supported at one end by a bearing 3 in a stationary front cover 4 and supported at the other end by a bush 5 in the end of the output shaft 6. A planet carrier 2′ is fixedly attached to or is an integral part of the input shaft 2. In FIG. 1 it is shown as an integral part. The planet carrier 2′ has a driving member 7 attached thereto by means of a plurality of planet pins 8 on which are mounted rotatable planet gear wheels 9 meshing with an annulus or ring gear 10 supported in a bearing 10′ in the stationary gear case 11 and splined to the output shaft 6. The planet wheels 9 also mesh with a sunwheel 12 splined at one end and connected to a driven member 13 axially slidable on the sunwheel 12, which is mounted for rotation on the input shaft 2. The driving member 7 is provided at one end with teeth to which are connected driving plates 14 of a direct drive clutch 15, the plates 14 being axially movable. The driven member 13 has two sets of teeth 16′ and 21′. The radially inner set of teeth 16′ is connected to the driven plates 16 of the direct drive clutch 15, these plates being axially movable with respect to the driven member 13. A reaction member 17 is permanently connected to the driven member 13 by a plurality of attachment screws 18, and disposed between these members is a pressure plate 19 axially movable with respect to the members 13 and 17 but constrained radially by a plurality of locating pins 20 on which it slides, the pins being permanently attached to the reaction member 17 and driven member 13.

The radially outer teeth 21′ of the driven member 13 are connected to inner plates 21 of the overdrive brake, the plates being axially movable with respect to the driven member 13 and in contact with a number of outer plates 23 which are axially movable but restrained from rotation by a plurality of retaining pegs 24 attached to the stationary gear case 11. A further axially movable outer plate 25 is disposed between the axially movable reaction member 17 and a stationary reaction plate 26 permanently attached to the gear case 11. The outer plate is similarly restrained from rotation.

The direct drive clutch 15 is maintained in the "drive" or locked condition by pressure from a plurality of high compression clutch springs 27, the ends of which locate in aligned recesses provided in the reaction member 17 and the pressure plate 19. This is the stationary or "normal" condition of the gearing. The axial thrust of the springs 27 is transmitted to the screws 18 via the pressure plate 19, the clutch 15 and the driven member 13. An equal and opposite thrust of the springs 27 is transmitted to the screws 18 via the reaction member 17. In this way, the screws 18 are under tension and there are no resultant axial thrusts to be transmitted to the bearings of the input and output shafts, and so no additional bearings are required to resist axial pressure.

Figure 2:
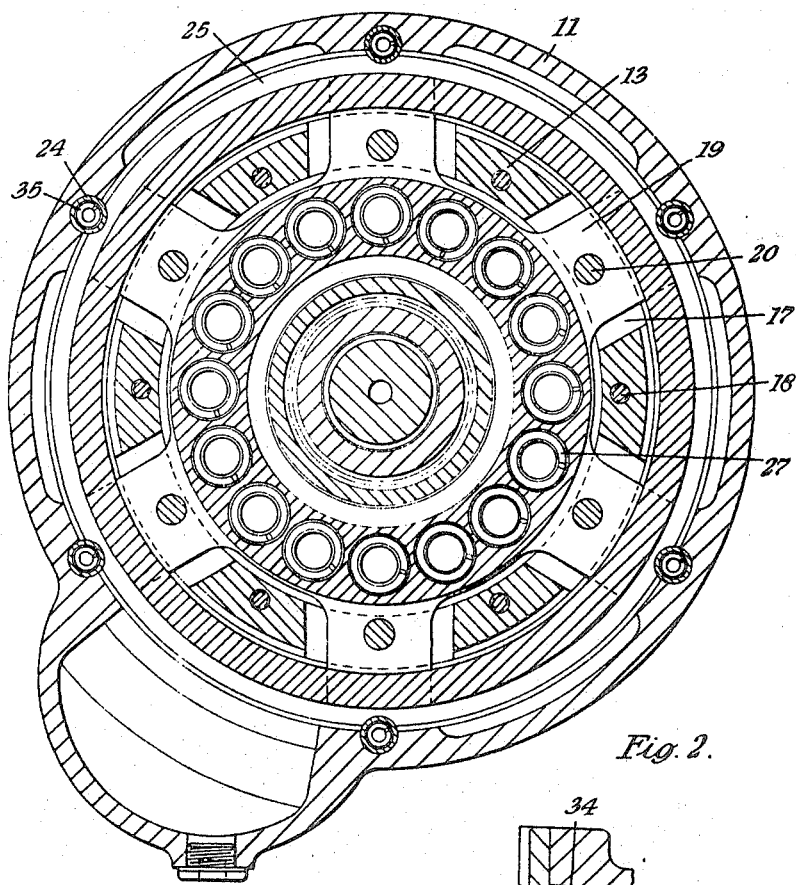
FIG. 2 shows a section taken through A—A in FIG. 1.

The pressure plate 19 is provided with a plurality of radial fingers or lugs 19′ (see FIG. 2) which are centrally disposed between each pair of attachment screws 18 and utilised to encompass the locating pins 20 on which the pressure plate 19 slides. The lugs 19′ are disposed in slots formed by matching recesses in the driven member 13 and the reaction member 17. This whole assembly is axially movable and is biased away from contact with the stationary reaction plate 26 by a light compression spring 29 between the sunwheel teeth 12 and the hub of the driven member 13, thereby preventing drag at this point in the direct drive condition. The thrust of this spring forces the driven number 13 into contact with the oil pump driving gear 30 attached to the input shaft 2.

Figure 3:
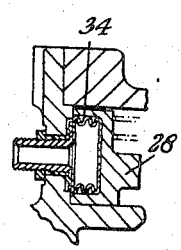
FIG. 3 shows another embodiment of the biasing means.

A cylinder 31 is formed by the stationary gear case 11 and the front cover 4 in which is an axially movable piston 28 having an inner 32 and an outer 33 seal, or in an alternative design an air bag 34 (FIG. 3) or diaphragm. The piston is utilised to apply axial thrust to the overdrive brake 22, this thrust being transmitted through the brake plates 21 and 23, direct-drive clutch pressure plate 19, clutch springs 27, reaction member 17 and single outer brake plate 25 and is resisted by stationary reaction plate 26. This piston 28 is biased towards the "off" position by a plurality of return springs 35 fitting into recessed ends of the retaining pegs 24.

The gradual transfer of drive from the direct drive clutch 15 to overdrive brake 22 during the change of ratio ensures that there is no "neutral" condition and enables the change to be effected under power.

To effect the change of ratio from "direct drive" to "overdrive" air under pressure is admitted to the cylinder 31 and forces the piston 28 into contact with the adjacent brake plates 23 against the action of the piston return springs 35, and there is little resistance at this stage. The assembly of the direct drive clutch 15, driven member 13, reaction member 17, pressure plate 19, clutch springs 27 and overdrive brake 22 plates is moved axially against the action of the light return spring 29 until contact is made with the stationary reaction plate 26. The direct drive clutch 15 is still in the fully locked condition at 0% slip, slight drag occurring in the overdrive brake 22, and the axial movement of the driven member 13 and reaction member 17 ceases. Increase of pressure in the cylinder 31 effects further movement of the piston 28, pressure plate 19 and overdrive brake 22 plates between these two members. This movement thrusts against the clutch springs 27 progressively transferring the "drive" from the direct drive clutch 15 to the overdrive brake 22, until the pressure plate 19 makes contact with the reaction member 17. At this stage the overdrive brake is fully locked at 0% slip, thus holding the sunwheel 12 stationary, the direct drive clutch is free and the gearing is in the overdrive condition, the planet wheels 9 driving the annulus 10 and the output shaft 6 at a higher speed than the input shaft 2.

To effect the change from overdrive to direct drive the air is exhausted from the cylinder and the sequence of movements is the exact reverse of that described above, the drive being progressively and smoothly transferred from the overdrive brake to the direct drive clutch.

The speed of the gear changes in both directions will be suitably controlled by the use of restrictors in the pneumatic valves or air lines to the cylinder, being of similar type to those used in the main change speed gearbox.

Lubrication is provided by an oil pump 36 (FIG. 1) situated in the front cover and driven by the pump driving gear 30 on the input shaft. The suction side of the pump draws oil from the sump of the stationary gear case 11 and the oil from the pressure side is directed via a muff tube 37, muff 38 and muff inner ring 39 into a central hole in the input shaft from where it is fed into the gearing.

Apart from the slight thrust exerted by the light compression spring 29 no axial load is transmitted to the bearings of the input or output shafts throughout the whole operation of the gear.

Figure 4:
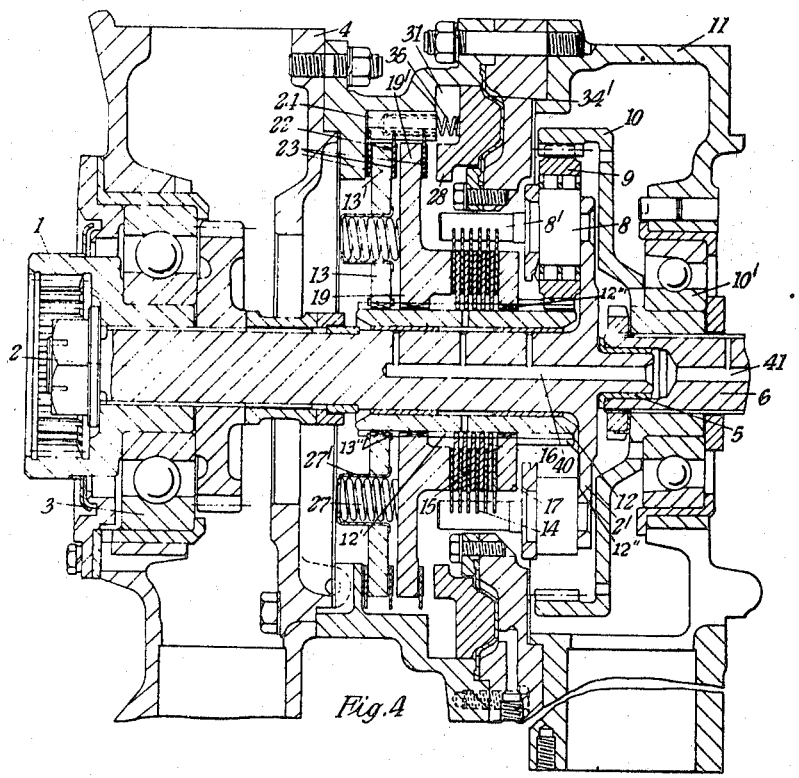
FIG. 4 shows a vertical section of a second embodiment of the auxiliary overdrive gear.

FIG. 4 shows a second simpler embodiment of the invention. Reference numerals as used in FIG. 1 refer to functionally similar parts.

In FIG. 4 planet carrier 2' is again an integral part of the input shaft 2. Sunwheel 12 is mounted for rotation on the input shaft 2 and can undergo slight axial movement. The sunwheel 12 has a spline portion 12' of half-tooth depth and is drivingly connected to driven member 13, reaction member 17, pressure plate 19 and a plurality of driven clutch plates 16 of the direct drive clutch 15. Pressure plate 19 and driven clutch plates 16 are axially slidable on the sunwheel 12. The driven member 13 is axially fixed to the sunwheel 12 by means of circlips 13''. The sunwheel 12 has a gear tooth portion 12'' of full-tooth depth meshing with planet wheels 9. Shoulder 12''' formed between the spline portion 12' and the gear tooth portion 12'' limits the axial movement of the reaction member 17 away from the driven member 13.

There is no driving member 7 as such, but planet pins 8 are extended to form driving pegs 8' to which are connected the driving plates 14 of the direct drive clutch 15, the plates being axially movable on the pegs 8'.

Radially outer parts 13' and 19' of the driven member 13 and pressure plate 19 are arranged to be in contact with plates 23 of brake 22 which are restrained from rotation by a plurality of returning pegs 24 attached to stationary gear case 11. One of the plates 23 is located between the pressure plate 19 and piston 28, which is axially movable in cylinder 31 formed in the stationary gear case 11. The piston 28 has a diaphragm 34' and is biased towards the off position by a plurality of return springs 35 located in recessed ends of the retaining pegs 24.

As for the embodiment of FIG. 1, the direct drive clutch 15 is maintained in the "drive" or locked condition by the axial thrust from a plurality of high compression clutch springs 27. These springs are seated in spring cups 27' located in apertures in the driven member 13, the springs 27 being on contact with the pressure plate 19. This is the stationary or "normal" condition of the gearing. The axial thrust of the springs 27 is transmitted to the sunwheel 12 via the pressure plate 19, the clutch 15, the reaction member 17 and the spline shoulder 12'''. An equal and opposite thrust of the springs 27 is transmitted to the sunwheel 12 via the driven member 13. In this way, the sunwheel is under tension and there are no resultant axial thrusts to be transmitted to the bearings 3 or 10' and so no additional bearings required to resist axial thrust.

As in the previous embodiment, the piston 28 is utilised to apply axial thrust to the overdrive brake. This thrust is transmitted through the plates 23, pressure plate 19, clutch springs 27, spring cups 27' and driven member 13, and is resisted by the stationary casing 11. Thus the overdrive brake thrust is contained within elements of the stationary casing 11. No load is applied by this thrust to the bearings in the gearing, nor are additional bearings required to resist this thrust.

To effect the change of ratio from "direct drive" to "overdrive" air under pressure is applied to the diaphragm 34' forcing the piston 28 into contact with one of the plates 23 against the action of the return springs 35, and there is little resistance at this stage. The assembly of the sunwheel 12, reaction member 17, direct drive clutch 15, pressure plate 19, springs 27, cups 27', driven member 13 and plates 23 is moved axially until contact is made with the stationary casing 11. The direct drive clutch 15 is still in the fully locked condition at 0% slip, slight drag occurring at the plates 23, and the axial movement of the sunwheel 12, reaction member 17, driven member 13, and the plate 23 which is between member 13 and casing 11 ceases. Increase of pressure at the diaphragm 34' effects further movement of the piston 28, pressure plate 19, and the plates 23 in contact with them. This movement thrusts against the clutch springs 27 progressively transferring the "drive" from the direct drive clutch 15 to the overdrive brake plates 23, until the presusre plate 19 is stopped by the resistance of the stationary casing 11, transferred through the plates 23 and driven member 13. At this stage the overdrive brake is fully locked at 0% slip, thus holding the sunwheel 12 stationary, the direct drive clutch is free and the gearing is in the overdrive condition, the planet wheels 9 driving the annulus 10 and the output shaft 6 at a higher speed than the input shaft 2.

To effect the change from overdrive to direct drive the air pressure is removed from the diaphragm and the sequence of movements is the reverse of that described above, the drive being progressively and smoothly transferred from the overdrive brake to the direct drive clutch.

The gradual transfer of drive from the direct drive clutch 15 to the overdrive brake during the change of ratio ensures that there is no "neutral" condition and enables the changes to be effected under power. As for the embodiment of FIG. 1 no axial load is transmitted to the bearings of the input or output shafts throughout the whole operation of the gear.

The speed of the gear changes in both directions will be suitably controlled as described above for the embodiment of FIG. 1.

Lubrication access is provided via axial holes 40, 41 in the input and output shafts, and is supplied from the main gearbox.

An important feature of the embodiment of FIGURE 4 is the simpler construction of the overdrive brake which incorporates only one set of plates, i.e., the radially outer stationary plates 23, the mating friction surfaces now being formed by extension 13', 19' of the flanged parts of the driven member 13 and pressure plate 19. Also the construction of the direct drive driving pegs 8' allows heat generated in the clutch to be dissipated more readily than in a construction in which the clutch is shrouded by other parts of the gearing. Thus, the clutch plates, which can lose heat more easily, have a longer life.

I claim:

1. In a two-speed auxiliary gear comprising a housing; bearings in the housing; co-axial input and output shafts rotatably mounted in the said bearings; a planetary gear arrangement including a sunwheel, a ring gear rotatably mounted in the said housing and connected to one of the said shafts, and at least one planet wheel and carrier connected to the other of the said shafts; the improvement comprising a multi-plate clutch operatively interposed between the sunwheel and the planet carrier, the said multi-plate clutch comprising a driven member engaging the sunwheel, a reaction member engaging the sunwheel, a pressure plate engaging the sunwheel and being axially movable between the reaction member and the driven member, spring means between the driven member and the pressure plate biasing the pressure plate towards the reaction member for normally maintaining the said multi-plate clutch to effect direct drive; means on the sunwheel limiting axial movement of the driven member in a direction away from the reaction member and means limiting axial movement of the reaction member in a direction away from the driven member for absorbing the action and reaction of the spring means and thereby preventing transference of the said action or reaction, to the said bearings; a brake operatively interposed between the sunwheel and the housing; and pneumatically-actuated biasing means for compressing the said spring means to actuate the brake and progressively change the drive from direct to indirect drive.

2. A two-speed auxiliary gear as claimed in claim 1, wherein the driven member is axially fixed to the sunwheel by means of circlips.

3. A two-speed auxiliary gear as claimed in claim 1 having driving pegs formed as extensions of the planet pins to which are connected the driving plates of the direct-drive clutch, the driven plates of the direct-drive cluch engaging the sunwheel, the direct-drive clutch locking the planet carrier to the sunwheel for direct drive.

4. A two-speed auxiliary gear as claimed in claim 3, wherein the ring gear is connected to the output shaft and the planet carrier is formed as an integral part of the input shaft.

5. A two-speed auxiliary gear as claimed in claim 4, wherein the input planet carrier has a plurality of equally spaced planet pins on which are mounted rotatable planet gear wheels which mesh with the ring gear, connected to the output shaft, and with the sunwheel acting as a torque reaction member for the overdrive condition.

6. A two-speed auxiliary gear as claimed in claim 1, wherein the brake has plates axially-movably and non-rotatably connected to the housing.

7. A two-speed auxiliary gear as claimed in claim 6, wherein the pneumatically-actuating biasing means comprise a cylinder and a piston movable therein under the influence of pneumatic pressure to move the pressure plate towards the driven member, thus compressing the spring means to disengage the clutch and bring the sunwheel to rest by applying the brake, the sunwheel acting as a torque-transmission reaction member.

References Cited

UNITED STATES PATENTS

| | | | |
|---|---|---|---|
| 2,115,964 | 5/1938 | Osborne | 74—781 |
| 2,507,050 | 5/1950 | Roberts | 74—781 |
| 2,870,655 | 1/1959 | Rockwell | 74—785 |
| 2,918,832 | 12/1959 | Meyers | 74—785 |
| 3,069,929 | 12/1962 | Hansen | 74—785 |

FOREIGN PATENTS

| | | |
|---|---|---|
| 456,007 | 11/1936 | Great Britain. |
| 944,038 | 12/1963 | Great Britain. |

DONLEY J. STOCKING, Primary Examiner

THOMAS C. PERRY, Assistant Examiner

U.S. Cl. X.R.

192—18